Aug. 26, 1958 J. R. DUFFY ET AL 2,849,220
INDUSTRIAL FURNACE WITH REMOVABLE COMBUSTION TUBES
Filed Sept. 28, 1953
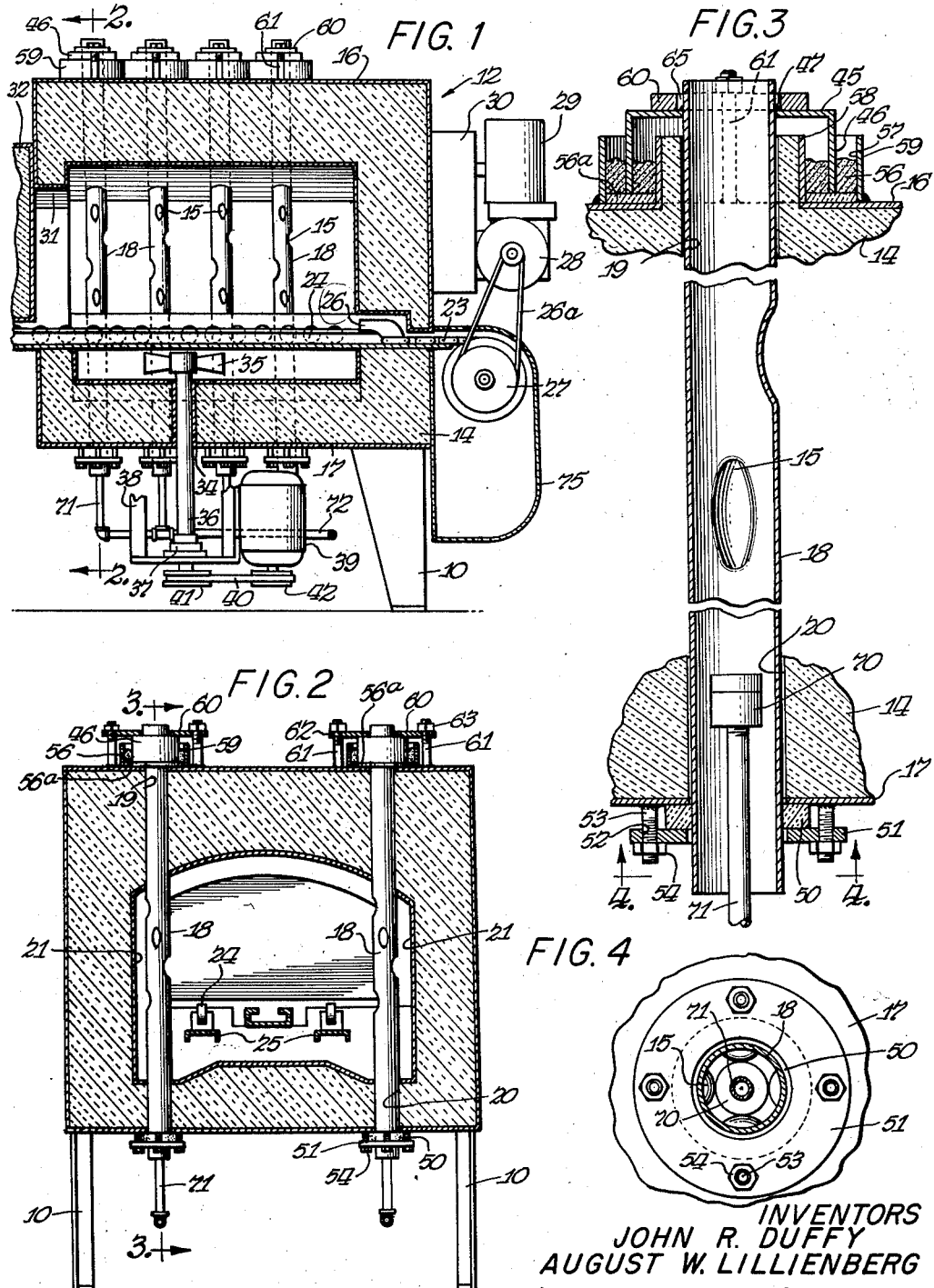
INVENTORS
JOHN R. DUFFY
AUGUST W. LILLIENBERG
BY Bair, Freeman & Molinare
ATTORNEYS United States Patent Office
2,849,220
Patented Aug. 26, 1958

2,849,220

INDUSTRIAL FURNACE WITH REMOVABLE COMBUSTION TUBES

John R. Duffy and August Wilford Lillienberg, Chicago, Ill., assignors to Lindberg Engineering Company Application September 28, 1953, Serial No. 382,686

3 Claims. (Cl. 263—42)

This invention relates to industrial furnaces such as those commonly used for heat treating metals. More particularly the invention relates to a novel combination of the furnace and combusion tubes which are adapted to radiate heat into the interior of the furnace.

In furnaces of this type the interior thereof is often permeated with gases capable of chemically reacting with metal parts placed in the furnace for treatment, such as hydrocarbons or ammonia. The temperatures at which these reactions take place range from about 1200° F. to 1800° F. These high temperatures in combination with the treating gases, cause the radiant tubes to burn out rather rapidly. Conventional furnaces have U-shaped tubes with the curved portion thereof disposed within the furnace and the free ends extending a short distance externally through the wall of the furnace. These tubes are fixed more or less permanently in the furnace wall. To replace a tube it is necessary to tear down the wall in the area surrounding the tube including the heavy refractory lining and then build it up again after the tube has been replaced. The replacement job, therefore, involves considerable expense in down-time and skilled labor.

The primary object of this invention is to provide a combustion tube construction capable of simple installation and removal by unskilled labor in a very short time without the necessity for dismantling any portion of the furnace wall or its refractory lining. Another object is to provide a vertical combustion tube which is slidably mounted through opposite horizontal walls of the furnace and means for sealing the tube where it pierces the furnace walls to confine the gaseous atmosphere within the furnace. Another object is the provision of a tube construction which moves, due to expansion and contraction, with respect to the lower horizontal furnace wall only.

A further object is to provide a combination tube and burner construction in which the combustion occurs uniformly along the length of the tube within the furnace interior.

These and other related objects, which will hereinafter become apparent from the sequent description in which is set forth certain preferred illustrated embodiments of our invention, are all embraced within this invention.

In the drawing:

Figure 1 is an elevational view, partly in section, of the furnace of this invention.

Figure 2 is a sectional view taken along the line 2—2 of Figure 1.

Figure 3 is a sectional view taken along the line 3—3 of the tube shown in Figure 2.

Figure 4 is a top sectional view along the line 4—4 of Figure 3.

The vertical open-ended combustion tubes of this invention are slidably mounted in openings through the top and bottom walls of the furnace. A gas burner or the like is mounted inside the tube near the lower end thereof for effecting combustion within the tube. The ratio of gas to air in the fuel mixture supplied to the burner is preferably deficient in air so that complete combustion will not take place at the burner and concentrate the heat in that segment of the tube. Oxygen required to burn the excess fuel is supplied in the form of secondary air induced through the lower end of the tube, which causes combustion in a long, soft flame along the length of the tube coextensive with the floor and roof of the furnace interior. Preferably, the combustion tubes are dimpled to provide bumps or protuberances on the interior surface thereof. These bumps cause turbulent flow of the gases within the tube to provide complete and thorough intermixing of the excess gas and the induced secondary air. The turbulence produced also results in better conductivity of heat through the wall of the combustion tube to the furnace interior.

By regulating the combustion in this manner the tubes heat uniformly and do not burn out as rapidly as when the heat is concentrated at one end of the tube. The temperature within the furnace is consequently more uniform. The lower end of the tube which is below the burner and in contact with a flow of cool secondary air entering at this point, is maintained at a temperature considerably below that prevailing at the upper end. Due to this difference in temperature, different means must be employed to seal the opening in the furnace wall through which the tube extends. At the lower, cooler end of the tube a gasket, such as those made from graphited asbestos, is secured to the bottom furnace wall at the margin of the opening in the wall through which the tube extends, and is adapted to fit snugly around the periphery of the tube. The gasket is compressed slightly to cause lateral distension to seal the annular space between the tube and opening but without preventing the tube from sliding vertically against the surface of the gasket. Thus the tube may be pushed past the inner circumference of the gasket when inserting or removing the tube from the furnace. The tube is cool enough at the lower end so that the asbestos gasket composition will not oxidize or disintegrate.

At the upper end of the tube gaskets cannot be mounted in contact with the tube. After a short period they completely pulverize due to the severe heat. We have, therefore, devised a seal for the tube at the top wall of the furnace which is not heat sensitive, and which facilitates removing the tube without altering the furnace except in a minor way. This sealing means comprises a collar secured to the circumference of the tube, said collar having a downwardly-turned vertical edge which dips into a sealing material such as sand, molten lead, mercury or other suitable non-combustible fluid material lying in a trough on the top wall of the furnace and surrounding the opening therein. A gasket may be placed in the bottom of the insulated trough to provide a positive seal with the lower edge of the flange where pressure in the furnace causes the gases to bubble through the fluid seal.

The tube is installed by sliding the lower end through the top and then through the bottom openings in the walls of the furnace until the vertical flange on the collar rests in the sealing composition. The tube slides past the burner which is centrally disposed within the tube a short distance above the lower furnace wall. Thus the top opening by means of the collar and sealing material, and the bottom opening by means of the gasket, are sealed from the atmosphere outside the furnace.

When the tube is subjected to extreme temperature variations, it will lengthen and shorten due to expansion and contraction. In some installations, the tube may be heavy enough to remain fixed at its upper end with respect to the furnace wall during expansion. However, we have found that in some instances, after several cycles of alternate expansion and contraction, the tube eventually rises sufficiently to lift the collar out of the sealing material, which, of course, permits the gases to escape from the interior of the furnace. Therefore, it is desirable to secure the tube by suitable mans at the top wall of the furnace. When this is done all movement which occurs due to expansion will be at the lower end with respect to the gasket which is adapted to provide a slidable seal.

Referring now to the drawing, the furnace indicated generally by the numeral 12 is mounted on rigid legs 10, and has an interior lining of solid refractory material 14 such as fire brick. A series of radiant tubes 18, having dimples 15, extend through apertures 19 and 20 in the upper wall 16, and the lower wall 17, of the furnace respectively. The tubes 18 are arranged in rows along the interior side walls 21 of the furnace. The number is variable in accordance with the size of the heating chamber. A pair of reciprocating conveyor chains, one at the front and one at the rear (only the rear chain 23 shown), are adapted to move a platform carrying the work to be treated into and out of the furnace through an opening 31, which is closed by an insulated vertically sliding door 32. The chain at the front pushes the work into the furnace and the chain at the rear pushes the work out of the furnace, both retracting after said operation. The platform is supported by a series of rollers 24, which in turn are mounted on axles supported by channel frames 25 connected to the frame of the furnace. All metal inside the furnace is made of a chromium-nickel heat-resistant alloy. The rear conveyor chain 23 is powered by a motor 29, mounted on brackets 30, at the rear of the furnace through pulleys 28 and 27, connected by a belt 26a. The platform carrying the work is moved out of the furnace by means of a pusher 26 connected to the chain 23 which then retracts into a gas-tight hood 75. A similar apparatus at the front of the furnace pushes the platform into the furnace. A fan 35, mounted on shaft 36, journalled in a bearing 34, located in the lower wall of the furnace and a second bearing 37, mounted on the bracket 38, depending from the frame of the furnace, is driven by a motor 39 through belt 40 and pulleys 41 and 42. The fan circulates the gases within the heating chamber of the furnace.

Reference is made to the tube construction, best shown in Figure 3, which is the novel portion of the furnace structure. Tubes 18 are preferably dimpled as indicated at 15 to effect mixing of the gaseous fuel and air and to promote continuous contact of the hot gases within the tubes with the walls thereof to secure a rapid and efficient transmission of heat therethrough. The upper end of the tube 18 has a circumferential collar 45, with a downwardly-turned vertical flange 46, extending from its circumference. The collar is welded, as indicated at 47, or secured by other suitable means to the tube in a completely sealed joint. The tube is open at each end. To seal the opening 20, in the bottom wall of the furnace, we have provided a heat-resistant circular gasket 50, made, for example, from graphited asbestos fibers. The inside diameter of the gasket is smaller than the diameter of the aperture 20 in the furnace wall, so that the gasket will fit snugly against the outside wall of the tube 18, but without binding. Gasket 50 covers the marginal area of the furnace wall surrounding aperture 20, and is fixed in place by means of a ring 51, having a series of openings therethrough uniformly spaced about its circumference and aligned with complementary studs 53, welded to the bottom of the furnace. The ring 51, slips over the studs and is compressed against the gasket by means of nuts 54, causing lateral distension of the gasket which promotes a tight seal against the tube. The ring 51 has an inside diameter about equal to that of the aperture 20 in the furnace wall so that the tube will pass freely therethrough. Only the gasket contacts the outside surface of the tube to prevent escape of gases from the interior of the furnace.

When the tube is in place as shown in Figure 3, the flange 46 at the upper end thereof dips into non-combustible fluid sealing material 56, contained in the annular trough 57, formed by spaced vertical circumferential flanges 58 and 59 projecting from top wall 16 of the furnace. A trough is not essential, but it is preferred to confine the sealing material even when it lacks the fluidity to spread out, as for example, sand. Preferably, an asbestos gasket 56a is provided in the bottom of the trough 57 against which the lower edge of flange 46 is compressed by means of a yoke, described below. The gasket 56a is used only in conjunction with the yoke, which provides sealing pressure. The gasket may be used alone or with sealing material and is especially desirable where the furnace is operating with a slightly pressurized gaseous atmosphere. In such cases the gases will be confined by the gasket, whereas the sealing fluid 56 may permit some gas to blow through.

It will be noted that the gasket 56a is spaced and insulated from the side wall of the tube by insulating refractory material 14. The high temperature of the tube at the upper end does not, therefore, seriously affect the gasket, which would normally disintegrate if in direct contact with the tube wall.

A rectangular strap or yoke 60, having a series of openings 65 therein adapted to receive the top ends of one bank of tubes 18, bear against the collar 45, to fix the tube to the top of the furnace. Two straps are required, one for each bank of tubes. The strap 60 is wide enough to extend beyond the trough 57 on either side of the tube, and has openings 62 near the side edges thereof which are adapted to receive studs 61, welded to the top 16 of the furnace opposite the center of the tubes 18. The number and location of the studs 61 and complementary openings 62 in the strap 60 are not critical, and may be placed where convenient. Nuts 63 screw onto the threaded outer ends of the studs 61 to anchor strap 60 and to prevent the tube 18 from moving upwardly. Any other suitable means may be employed to prevent movement of the tube with respect to the top surface of the furnace due to alternate expansion and contraction. The means may serve to lock a bank of tubes, as that illustrated, or may serve to lock only a single tube. In some instances, if the tube is heavy enough it will remain in place by gravity.

The tubes 18 are fired by means of centrally disposed burners 70 in the lower end thereof, mounted on the ends of pipes 71 which in turn connect to a fuel supply manifold 72.

In operation, the fuel, preferably natural gas, thoroughly premixed with an amount of air insufficient for complete combustion (about 20–30% less), is introduced into the manifold 72 and passes therefrom through pipes 71 to the burners 70 in each tube. By supplying an insufficient amount of air to the burner, the fuel burns slowly and the flame advances up the tube as the amount of additional air required for complete combustion is induced through the lower opening of the tube 18. The dimples in the tubes cause the secondary air to become completely mixed with the excess or noncombusted fuel so that combustion occurs within the section of the tube coextensive with the floor and the roof of the furnace interior. Thus the tube may be heated uniformly along its length or segments thereof by controlling the proportion of primary and secondary air. The bottom of the tube always remains relatively cool because no burning takes place therein and the entering cool secondary air conducts some of the heat away.

To remove a tube it is necessary first to remove the strap or yoke 60 (if one is employed in the construction) and then pull the tube out from the top side of the furnace. A new tube may be inserted in the same way. The sealing gasket 50 at the lower end of the tube is resilient enough to conform to the tube without hindering insertion. The friction between the gasket and the tube may be adjusted if too little or too great by tightening or loosening the nuts 54 which urge the ring 51 against gasket 50. When required, the gasket 50 may be replaced with the tube.

While we have described the invention in more or less detail, it will occur to those skilled in the art that various modifications may be made with respect to details of construction and arrangement of parts; hence, we do not intend to limit the invention except as may be required by a fair interpretation of the appended claims.

What is claimed is:

1. In a heat treating furnace, a vertical open ended combustion tube for radiantly heating the interior of the furnace, said tube extending through the top and bottom walls of the furnace and having inwardly extending dimples spaced circumferentially and lengthwise thereof within the furnace, a burner mounted centrally within the tube and spaced upwardly from the lower open end thereof, means for supplying said burner with a mixture of fuel and primary air insufficient to completely burn the fuel, there being an annular space between the burner and the tube for admitting a stream of secondary air through said lower open end of the tube, said dimples progressively agitating said secondary air stream and promoting mixing thereof with the unburned fuel, thus effecting progressive combustion throughout the length of the tube within the furnace.

2. In a heat treating furnace having vertically spaced top and bottom walls formed with vertically aligned openings therein, an elongated straight vertical combustion tube open at both ends for radiantly heating the interior of the furnace slidably mounted in said aligned openings in the top and bottom walls of the furnace, sealing means secured to the upper end of the tube and cooperating with the top wall of the furnace to seal the top opening around the tube and to support the tube, an annular resilient gasket secured to the margin of the lower surface of the bottom furnace wall surrounding the lower opening and adapted to fit snugly against the tube to seal said opening, the lower end of the tube being slidable vertically through the gasket, and a burner mounted within the tube above said gasket and spaced from the inner wall of the tube to permit upward flow of secondary air therearound, said tube being removable merely by sliding it upwardly through said openings in the top wall, means to supply said burner with a fuel mixture too rich to burn completely, and inwardly extending dimples spaced circumferentially and longitudinally in the wall of the tube for progressively intermixing the unburned fuel and secondary air supplied through the lower end of the tube to provide progressive combustion along the length of the tube.

3. A method for heating a furnace having an open ended straight radiant tube extending vertically through opposed walls thereof which comprises burning fuel with a quantity of primary air insufficient for complete combustion at a point centrally disposed within the tube and spaced above the lower open end thereof, causing the products of combustion and the excess fuel to flow substantially straight through the central portion of the tube, simultaneously drawing an annular stream of secondary air through said open end and over the inner wall of the tube, periodically deflecting said annular stream inwardly toward the central portion of the tube at spaced points along the length of the tube and at different angular positions in the circumference of the tube to mix the secondary air progressively with said excess fuel to cause said excess fuel to burn progressively along the length of the tube.

References Cited in the file of this patent

UNITED STATES PATENTS

| 1,734,870 | Morse | Nov. 5, 1929 |
| 1,991,788 | Cartter | Feb. 19, 1935 |
| 2,086,970 | Wilson | July 13, 1937 |
| 2,115,769 | Harris | May 3, 1938 |
| 2,253,920 | Vaughan | Aug. 26, 1941 |
| 2,472,497 | Stookey | June 7, 1949 |
| 2,485,995 | Armstrong | Oct. 25, 1949 |

FOREIGN PATENTS

| 497,912 | Germany | May 15, 1930 |
| 576,853 | Great Britain | Apr. 23, 1946 |
| 675,276 | Great Britain | July 9, 1952 |